(12) United States Patent
Ghorpade et al.

(10) Patent No.: US 11,280,239 B2
(45) Date of Patent: Mar. 22, 2022

(54) OUTLET FLOW MIXERS FOR SELECTIVE CATALYTIC REDUCTION SYSTEMS OF WORK VEHICLES

(71) Applicant: CNH Industrial America LLC, New Holland, PA (US)

(72) Inventors: Kaushal Ghorpade, Chicago, IL (US); Daniel Alan Morey, Mundelein, IL (US); Hesam Abbassi, Birmingham, MI (US); Panos Tamamidis, Mount Prospect, IL (US); Samrendra K. Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/803,236

(22) Filed: Feb. 27, 2020

(65) Prior Publication Data
US 2021/0270170 A1    Sep. 2, 2021

(51) Int. Cl.
*F01N 3/20* (2006.01)
*F01N 3/28* (2006.01)
*F01N 11/00* (2006.01)

(52) U.S. Cl.
CPC .......... *F01N 3/2066* (2013.01); *F01N 3/2892* (2013.01); *F01N 11/007* (2013.01)

(58) Field of Classification Search
CPC combination set(s) only.
See application file for complete search history.

(56) References Cited

U.S. PATENT DOCUMENTS

| | | | |
|---|---|---|---|
| 7,549,511 B2 | 6/2009 | Marocco | |
| 7,941,995 B2 | 5/2011 | Goss et al. | |
| 8,359,832 B2 | 1/2013 | Yi et al. | |
| 8,539,761 B2 | 9/2013 | Lebas et al. | |
| 8,635,858 B2 | 1/2014 | Levin et al. | |
| 8,844,270 B2 | 9/2014 | Wagner et al. | |
| 9,027,330 B2 | 5/2015 | Edholm | |
| 9,221,016 B2 | 12/2015 | Van Niekerk et al. | |
| 9,387,438 B2 * | 7/2016 | Golin | B01D 53/9495 |
| 9,598,999 B2 | 3/2017 | De Rudder et al. | |

(Continued)

FOREIGN PATENT DOCUMENTS

DE   102014222395 A1   5/2016

*Primary Examiner* — Binh Q Tran
(74) *Attorney, Agent, or Firm* — Rickard K. DeMille; Rebecca L. Henkel

(57) ABSTRACT

A selective catalytic reduction (SCR) system includes a SCR canister including a SCR inlet configured for receiving engine exhaust from a work vehicle and a SCR outlet configured for expelling a treated exhaust flow. The system includes first and second SCR chambers housed within the SCR canister and configured to react mixtures of exhaust reductant and associated first and second portions of the engine exhaust with a catalyst to generate first and second treated exhaust flow portions, respectively. The system includes an outlet chamber positioned between the SCR outlet and the first and second SCR chambers. Moreover, the outlet chamber is configured to combine the first and second treated exhaust flow portions to form the treated exhaust flow. Further, the system includes a chamber mixer positioned upstream of the SCR outlet and configured to promote mixing of the first and second treated exhaust flow portions within the outlet chamber.

16 Claims, 6 Drawing Sheets

(56) References Cited

U.S. PATENT DOCUMENTS

| | | | |
|---|---|---|---|
| 9,707,525 B2 | 7/2017 | De Rudder et al. | |
| 9,737,907 B2 | 8/2017 | Hornback et al. | |
| 9,759,108 B2 * | 9/2017 | Wikaryasz | F01N 3/2066 |
| 9,945,278 B2 | 4/2018 | Wright et al. | |
| 10,086,333 B2 | 10/2018 | Denton et al. | |
| 10,179,315 B2 | 1/2019 | Brandl et al. | |
| 10,895,188 B2 * | 1/2021 | Kobayashi | F01N 3/20 |
| 10,914,218 B1 * | 2/2021 | Chapman | F01N 3/021 |
| 2009/0288394 A1 * | 11/2009 | Kesse | F02D 41/0275 60/286 |
| 2011/0146253 A1 * | 6/2011 | Isada | F01N 3/2073 60/302 |
| 2012/0204541 A1 | 8/2012 | Li et al. | |
| 2017/0282135 A1 | 10/2017 | Whitten et al. | |
| 2019/0331016 A1 * | 10/2019 | Morey | B01F 3/02 |

\* cited by examiner

OUTLET FLOW MIXERS FOR SELECTIVE CATALYTIC REDUCTION SYSTEMS OF WORK VEHICLES

FIELD

The present subject matter relates generally to the treatment of engine exhaust gases of work vehicles, and more particularly, to outlet flow mixers for selective catalytic reduction systems of work vehicles for increasing the accuracy of a downstream exhaust sensor, such as a nitrous oxide (NOx) sensor, due to more homogeneously mixed exhaust gases.

BACKGROUND

Typically, work vehicles, such as tractors and other agricultural vehicles, include an exhaust treatment system for controlling engine emissions. As is generally understood, exhaust treatment systems for work vehicles often include a diesel oxidation catalyst (DOC) system in fluid communication with a selective catalytic reduction (SCR) system. The DOC system is generally configured to oxidize carbon monoxide and unburnt hydrocarbons contained within the engine exhaust and may include a mixing chamber for mixing an exhaust reductant, such as a diesel exhaust fluid (DEF) or any other suitable urea-based fluid, into the engine exhaust. For instance, the exhaust reductant is often pumped from a reductant tank mounted on and/or within the vehicle and injected onto the mixing chamber to mix the reductant with the engine exhaust. The resulting mixture may then be supplied to the SCR system to allow the reductant to be reacted with a catalyst in order to reduce the amount of nitrous oxide (NOx) emissions contained within the engine exhaust. A NOx sensor is typically positioned downstream of the SCR system to monitor the amount of NOx emissions still remaining in the exhaust flow exiting the exhaust treatment system. The data from the sensor may, for example, be used to control the combustion temperature of the engine and/or the amount of reductant injected into the mixing chamber to ensure that the amount of NOx emissions remains below a given amount.

Many SCR systems include multiple different catalyst lines, which are combined upstream of the NOx sensor. However, in many instances, the engine exhaust associated with separate catalyst lines may not be fully mixed before encountering the NOx sensor. As such, the NOx sensor may underestimate or overestimate a concentration of NOx within the exhaust gas associated with the exhaust treatment system. Overestimating the amount of NOx within the engine exhaust may result in an excessive amount of the reductant being injected into the engine exhaust. This can lead to clogging of the catalyst lines, increased reductant consumption, higher backpressure within the exhaust treatment system, and/or increased ammonia slip within the exhaust system. Contrarily, injecting an inadequate amount of the reductant may lead to excessive NOx emissions contained within the engine exhaust gas.

Accordingly, an improved SCR system that increases the accuracy of an exhaust sensor position downstream of the SCR would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a selective catalytic reduction (SCR) system. The SCR system includes a SCR canister including a SCR inlet configured for receiving engine exhaust from a work vehicle. The SCR canister also includes a SCR outlet configured for expelling a treated exhaust flow. The system further includes a first SCR chamber housed within the SCR canister and configured to react a mixture of exhaust reductant and a first portion of the engine exhaust with a catalyst to generate a first treated exhaust flow portion. Additionally, the system includes a second SCR chamber housed within the SCR canister and configured to react a mixture of exhaust reductant and a second portion of the engine exhaust with the catalyst to generate a second treated exhaust flow portion. The system also includes an outlet chamber positioned between the SCR outlet and the first and second SCR chambers. Moreover, the outlet chamber is configured to combine the first treated exhaust flow portion and the second treated exhaust flow portion to form the treated exhaust flow. Further, the system includes a chamber mixer positioned upstream of the SCR outlet and configured to promote mixing of the first and second treated exhaust flow portions within the outlet chamber.

In another aspect, the present subject matter is directed to an exhaust treatment system for a work vehicle. The system includes an exhaust conduit configured for transmitting engine exhaust from an engine. The system further includes a DOC system in flow communication with the exhaust conduit and configured to introduce an exhaust reductant into the engine exhaust to form an exhaust/reductant mixture. The system also includes a selective catalytic reduction (SCR) system. The SCR system includes a SCR canister including a SCR inlet configured for receiving the exhaust/reductant mixture expelled from the DOC system. The SCR canister further includes a SCR outlet configured for expelling a treated exhaust flow. The SCR system also includes a first SCR chamber housed within the SCR canister and configured to react a first portion of the exhaust/reductant mixture with a catalyst to generate a first treated exhaust flow portion. The SCR system additionally includes a second SCR chamber housed within the SCR canister and configured to react a second portion of the exhaust/reductant mixture with a catalyst to generate a second treated exhaust flow portion. Further, the SCR system includes an outlet chamber positioned between the SCR outlet and the first and second SCR chambers. Moreover, the outlet chamber is configured to combine the first treated exhaust flow portion and the second treated exhaust flow portion to form the treated exhaust flow. Further, the SCR system includes a chamber mixer positioned upstream of the outlet chamber and configured to promote mixing of the first and second treated exhaust flow portions within the outlet chamber.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
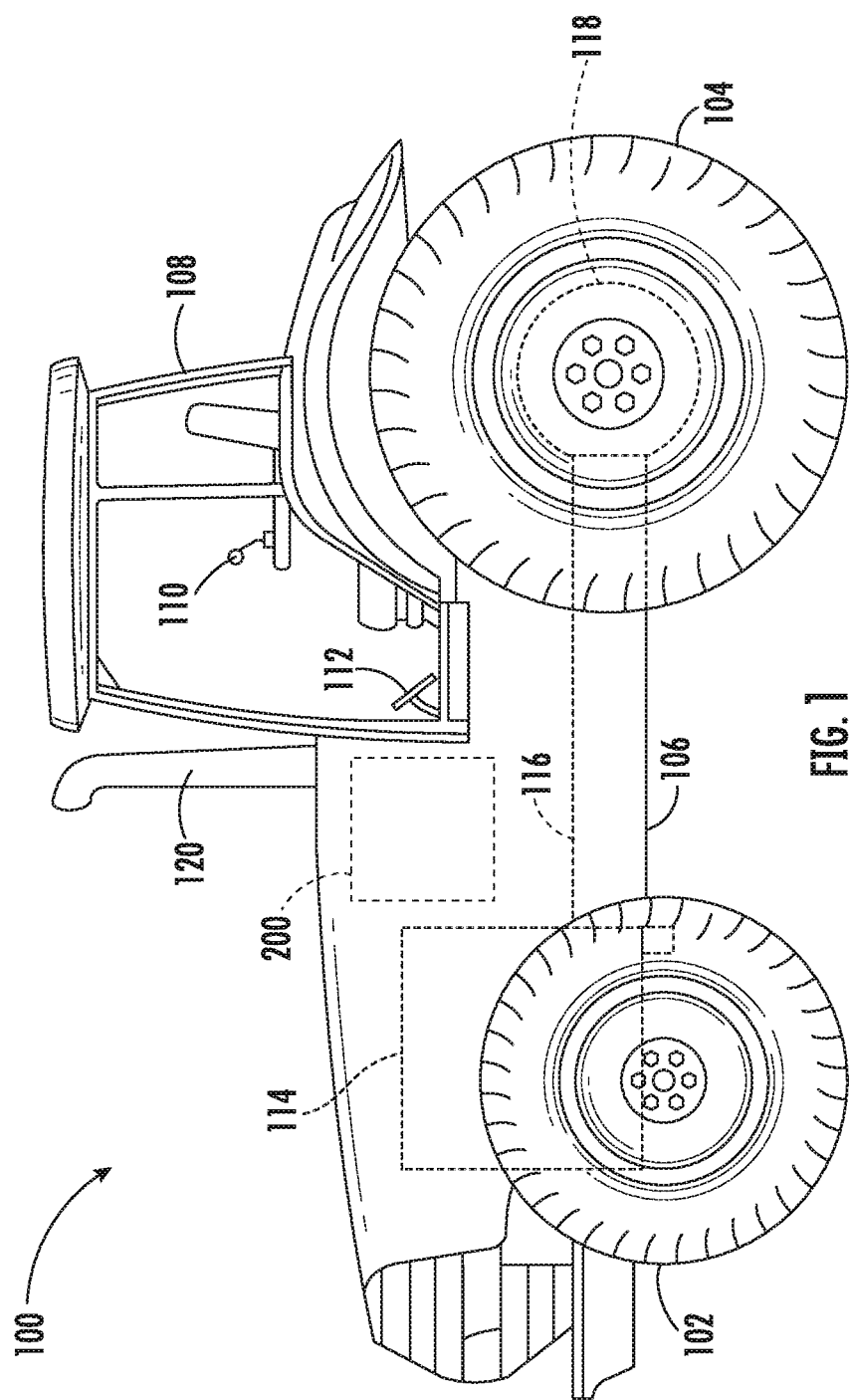
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an exhaust treatment system for a work vehicle, particularly to a selective catalytic reduction (SCR) system for an exhaust treatment system for a work vehicle. In several embodiments, the SCR system includes an SCR canister including an inlet for receiving engine exhaust of the work vehicle and an outlet configured to expel a treated exhaust flow. Further, the SCR system defines separate flowpaths or catalytic lines within the SCR canister and associated SCR chambers. Each SCR chamber is configured to react a mixture of exhaust reductant and a portion of the engine exhaust with a catalyst to generate a treated exhaust flow portion. Additionally, an outlet chamber is positioned between the SCR chambers and the SCR outlet such that the separate treated exhaust flow portions are combined within the outlet chamber to form the treated exhaust flow. In addition, the SCR system includes a chamber mixer positioned upstream of the SCR outlet and configured to promote mixing of the treated exhaust flow portions within the outlet chamber. For example, the chamber mixer may be positioned within an outlet of one or more of the SCR chambers. As another example, the chamber mixer may be positioned within the outlet chamber, such as at an upstream position within the outlet chamber relative to the treated exhaust flow.

The chamber mixer is configured to promote mixing of the treated exhaust flow portions by introducing turbulence into one or more of the exhaust flow portions. In several embodiments, an exhaust sensor may be positioned within a downstream flow conduit extending from the SCR outlet to monitor the concentration or amount of emissions remaining within the exhaust flow following treatment within the SCR system. By more effectively mixing the treated exhaust flow portions within the outlet chamber, the sensor readings from the downstream exhaust sensor may more accurately represent harmful or undesirable gas emissions within the treated exhaust flow as a whole. Furthermore, an associated controller may implement a control action, such as adjusting the combustion temperature of the engine and/or varying the amount of reductant injected into the engine exhaust system, based on a more accurately determined amount of exhaust emissions contained within the treated exhaust flow. As such, the disadvantages associated with inaccurate emissions readings may be reduced or eliminated. For instance, overestimation of the amount of emissions within the exhaust flow may be avoided and thus prevent or reduce the amount of reductant injected in response. Several issues associated with excessive reductant injection may thus be avoided, such as clogging of the catalyst lines, increased reductant consumption, higher backpressure within the exhaust treatment system, and/or increased ammonia slip within the exhaust system. Similarly, issues associated with inadequate reductant injection in response to underestimation of the amount of emissions within the engine exhaust flow may similarly be avoided, such as excessive NOx emissions contained within the treated exhaust flow. Furthermore, a suitable chamber mixer as described herein may be a simple addition to the assembly process of SCR systems and/or easily be installed into preexisting SCR systems. For instance, several embodiments of the disclosed chamber mixer may be easily manufactured and assembled and have minimal spacing requirements within the SCR canisters of SCR systems.

Referring now to the drawings, FIG. 1 illustrates a side view of one embodiment of a work vehicle 100. As shown, the work vehicle 100 is configured as an agricultural tractor. However, in other embodiments, the work vehicle 100 may be configured as any other suitable work vehicle known in the art, such as various other agricultural vehicles, earth-moving vehicles, road vehicles, all-terrain vehicles, off-road vehicles, loaders, and/or the like.

As shown in FIG. 1, the work vehicle 100 includes a pair of front wheels 102, a pair of rear wheels 104, and a chassis 106 coupled to and supported by the wheels 102, 104. An operator's cab 108 may be supported by a portion of the chassis 106 and may house various control devices 110, 112 (e.g., levers, pedals, control panels and/or the like) for permitting an operator to control the operation of the work vehicle 100. Additionally, the work vehicle 100 may include an engine 114 and a transmission 116 mounted on the chassis 106. The transmission 116 may be operably coupled to the engine 114 and may provide variably adjusted gear ratios for transferring engine power to the wheels 104 via a differential 118.

Moreover, the work vehicle 100 may also include an exhaust treatment system 200 for reducing the amount emissions contained within the exhaust from the engine 114. For instance, engine exhaust expelled from the engine 114 may be directed through the exhaust treatment system 200 to allow the levels of nitrous oxide (NOx) emissions contained within the exhaust to be reduced significantly. The cleaned or treated exhaust gases may then be expelled from the exhaust treatment system 200 into the surrounding environment via an exhaust pipe 120 of the work vehicle 100.

It should be appreciated that the configuration of the work vehicle 100 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 114, transmission 116, and differential 118 are coupled, a configuration common in smaller tractors. Still, other configurations may use an articulated chassis to steer the work vehicle 100 or rely on tracks in lieu of the wheels 102, 104. Additionally, although not shown, the work vehicle 100 may also be configured to be operably coupled to any suitable type of work implement, such as a trailer, spray boom, manure tank, feed grinder, plow, and/or the like.

Figure 2:
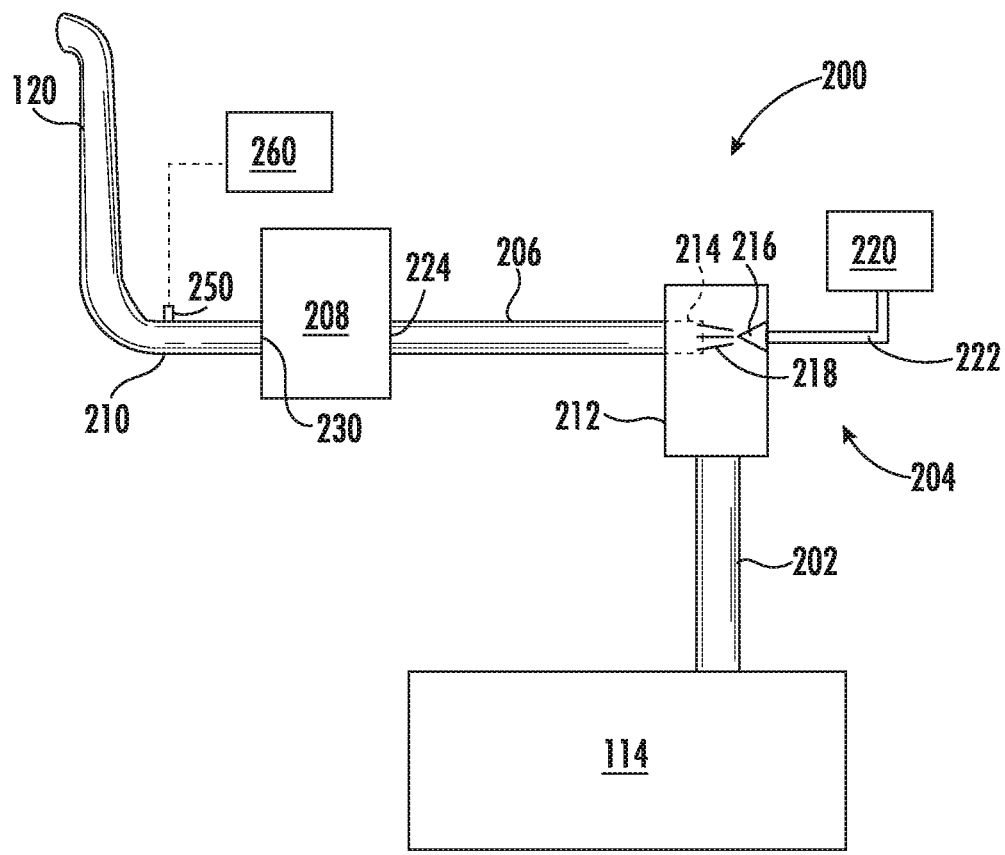
FIG. 2 illustrates a schematic view of one embodiment of an exhaust treatment system suitable for use with a work vehicle in accordance with aspects of the present subject matter.

Referring now to FIG. 2, a schematic diagram of one embodiment of an exhaust treatment system 200 suitable for use with a work vehicle is illustrated in accordance with aspects of the present subject matter. As represented in FIG. 2, the exhaust treatment system 200 includes an exhaust conduit 202, a diesel oxidation catalyst (DOC) system 204, a mixing conduit 206, a selective catalytic reduction (SCR) system 208, and a treated exhaust flow conduit 210. During operation of the work vehicle 100, exhaust expelled from the engine 114 is received by the exhaust conduit 202 and flows through the conduit 202 to the DOC system 204. As is generally understood, the DOC system 204 is configured to reduce the levels of carbon monoxide and hydrocarbons present in the engine exhaust. For example, as shown in FIG. 2, the DOC system 204 includes a canister or chamber 212 for receiving engine exhaust from the exhaust conduit 202, with the chamber 212 being in flow communication with an upstream end 214 of the mixing conduit 206. In addition, the DOC system 204 includes a reductant injector nozzle 216 provided in association with the chamber 212 at a location at or adjacent to the upstream end 214 of the mixing conduit 206 to allow an exhaust reductant 218, such as a diesel exhaust fluid (DEF) or any other suitable urea-based fluid, to be injected into the stream of exhaust gases flowing through the chamber 212. For instance, as shown in FIG. 2, the reductant injector nozzle 216 may be fluidly coupled to a source of exhaust reductant (e.g., storage tank 220) via a hose or other fluid coupling 222 to allow liquid exhaust reductant to be supplied to the nozzle 216. The engine exhaust and exhaust reductant flowing into the upstream end 214 of the mixing conduit 206 are then directed through the conduit 206 to the downstream end 224 thereof for receipt by the SCR system 208, within which the mixture of exhaust/reductant is reacted with a catalyst to generate a treated exhaust flow in which the amount of harmful or undesirable gas emissions has been reduced as compared to the engine exhaust initially discharged from the engine 114. The treated exhaust flow is then expelled from a SCR outlet 230 of the SCR system 208 and is directed through the downstream flow conduit 210 for discharge into the atmosphere (e.g., via an exhaust pipe 120 forming part of or coupled to the downstream flow conduit 210).

Additionally, as shown in FIG. 2, the exhaust treatment system 200 includes an exhaust sensor 250 positioned within the downstream flow conduit 210 to monitor the concentration or amount of emissions remaining within the exhaust flow following treatment within the SCR system 208. In one embodiment, the exhaust sensor 250 comprises one or more nitrous oxide (NOx) sensors configured to detect the amount of NOx contained within the treated exhaust flow. However, in other embodiments, the exhaust sensor 250 may comprise any other suitable sensors or combination of sensors configured to detect the concentration or amount of gaseous emissions contained within the treated exhaust flow, including the detection of gaseous emissions other than NOx and/or the detection of NOx in combination with one or more other gaseous emissions. As shown, in FIG. 2, in one embodiment, the exhaust sensor 250 is communicatively coupled to a controller 260 (e.g., a computing device or another other suitable processor-based device) configured to monitor the exhaust emissions contained within the treated exhaust flow based on the data received from the sensor 250. The controller 260 may then, for example, compare the concentration or amount of detected exhaust emissions to a predetermined limit or threshold and control one or more components of the work vehicle 100 based on such comparison, such as by adjusting the combustion temperature of the engine 114 and/or varying the amount of the exhaust reductant 218 injected into the DOC system 204 to ensure that the exhaust emissions remain below a predetermined limit or threshold.

Figure 3:
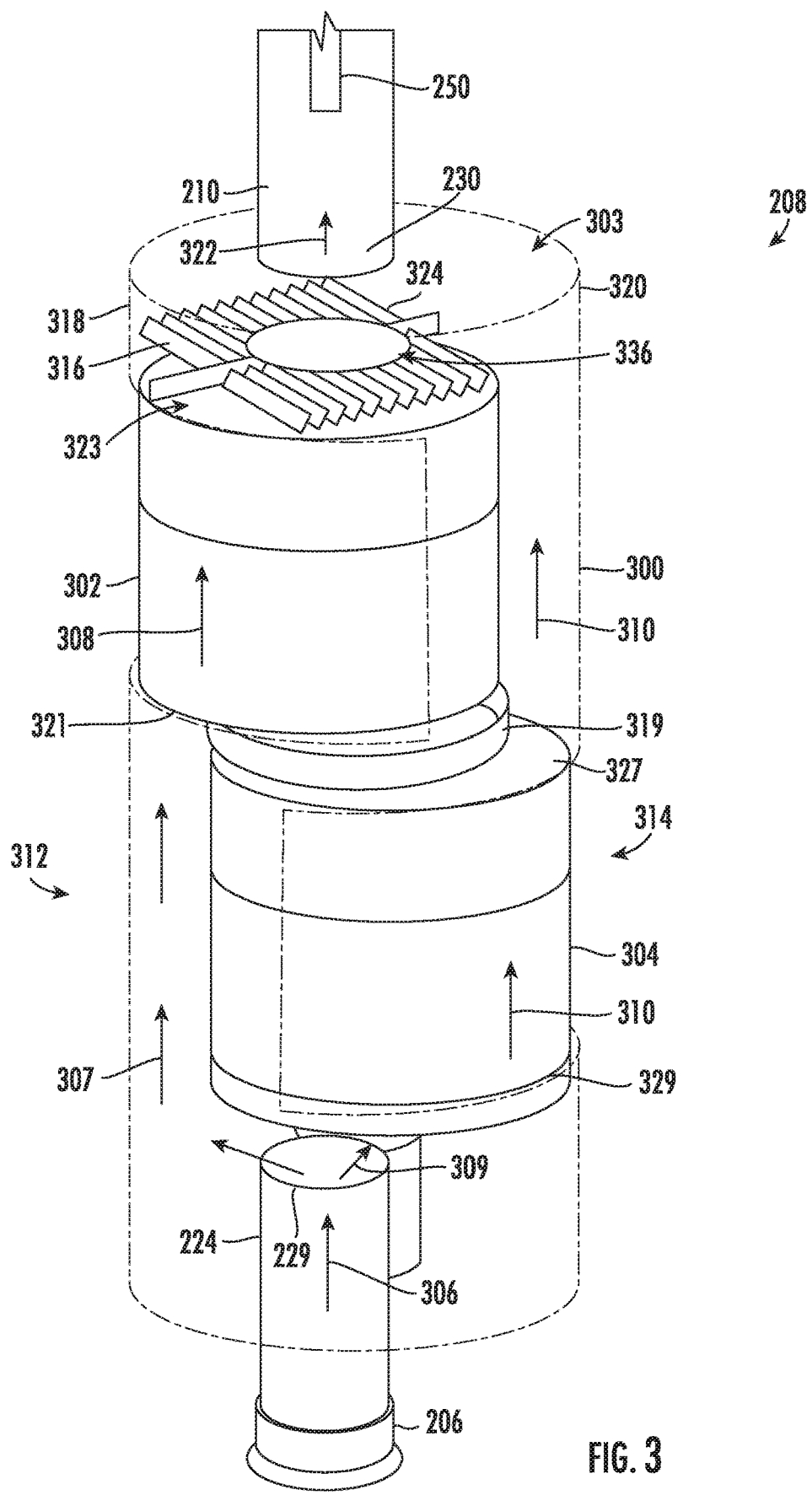
FIG. 3 illustrates a pictorial view of one embodiment of a selective catalytic reduction (SCR) system suitable for use within the disclosed exhaust treatment system in accordance with aspects of the present subject matter, particularly illustrating the SCR system and an associated chamber mixer.

Referring now to FIG. 3, a pictorial view of one embodiment of an SCR system 208 that may be utilized in association with an exhaust treatment system of a work vehicle is illustrated in accordance with aspects of the present subject matter. In general, the SCR system 208 will be described herein in reference to the exhaust treatment system 200 and work vehicle 100 described above with reference to FIGS. 1 and 2. However, it should be appreciated by those of ordinary skill in the art that the disclosed SCR system 208 may generally be utilized with work vehicles and/or exhaust treatments systems having any other suitable work vehicle configuration and/or exhaust treatment system configuration, respectively.

As shown in FIG. 3, the SCR system 208 may include an SCR canister 300 (illustrated in phantom). The SCR canister 300 may house a number of SCR chambers within which a mixture of engine exhaust/reductant (represented by arrow 306) is reacted with a catalyst to generate a treated exhaust flow (represented by arrow 322) in which the harmful or undesirable gas emissions have been reduced as compared to the engine exhaust 306 before being expelled at the SCR outlet 230. For instance, as shown, the SCR canister 300 may house a first SCR chamber 302 and a second SCR chamber 304 defining, at least in part, a first exhaust flowpath 312 and a second exhaust flowpath 314 for treatment of the engine exhaust 306. As shown, the engine exhaust 306 may be split at an inlet 229 of the SCR canister 300 into a first portion of the engine exhaust 307 and a second portion of the engine exhaust 309 in order to flow along the first and second exhaust flowpaths 312, 314, respectively. While the embodiment of the SCR system 208 depicted in FIG. 3 illustrates two SCR chambers 302, 304, it should be appreciated the SCR system 208 may include more than two SCR chambers associated with additional exhaust flowpaths, and the subject matter described herein may be equally applicable to a SCR system defining three or more exhaust flowpaths.

In the depicted embodiment, the first portion of the engine exhaust 307 may flow along the first exhaust flowpath 312, including the first SCR chamber 302, such that a mixture of exhaust reductant and the first portion of the engine exhaust 307 is reacted within the first SCR chamber 302 with a catalyst to generate a first treated flow portion 308. Similarly, the second portion of the engine exhaust 309 may flow along the second exhaust flowpath 314, including the second SCR chamber 304, such that a mixture of exhaust reductant and the second portion of the engine exhaust 309 is reacted within the second SCR chamber 304 with a catalyst to generate a second treated flow portion 310. Furthermore, an outlet chamber 303 may be defined within the SCR canister 300 and positioned downstream of the first and second SCR chambers 302, 304 and immediately upstream of the SCR outlet 230. As such, the outlet chamber 303 may generally include a void within the SCR canister 300 directly upstream of the SCR outlet 230. Moreover, the outlet chamber 303 may be configured to combine and mix the first treated exhaust flow portion 308 and the second treated exhaust flow portion 310 into the treated exhaust flow 322 expelled from the SCR outlet 230 of the SCR canister 300, e.g., into the downstream flow conduit 210.

As described generally above, SCR system 208 may include an exhaust sensor 250 arranged within the downstream flow conduit 210. For example, the exhaust sensor 250 may be positioned within the downstream flow conduit 210 downstream of the outlet chamber 303 and configured to allow the concentration or amount of emissions remaining within the treated exhaust flow 322 to be monitored. Additionally, the exhaust sensor 250 may be configured to extend radially inwardly from an inner surface of the flow conduit 210 such that at least a portion of the sensor 250 is positioned directly within and/or otherwise directly exposed to the treated exhaust flowing downstream of the chamber mixer 303. In this regard, it should be noted that the exhaust sensor 250 may not be shielded or otherwise protected from the flow of treated exhaust via an upstream deflector. Rather, a portion of the treated exhaust flow 322 may flow directly into and/or across the exhaust sensor 250 to allow the sensor 250 to provide accurate data relating to the gaseous emission(s) being monitored. In other embodiments, an upstream deflector may be positioned within the downstream flow conduit 210 between the exhaust sensor 250 and the chamber mixer 303.

However, in certain situations, the first treated flow portion 308 and second treated flow portion 310 expelled from the respective SCR chambers 302, 304 may not be adequately mixed within the outlet chamber 303 before encountering the exhaust sensor 250. Furthermore, the harmful or undesirable gas emissions may not be reduced to the same or similar degrees within the first and second SCR chambers 302, 304. As such, the exhaust sensor 250 may encounter more of the first treated flow portion 308 or the second treated flow portion 310, which may inaccurately represent the amount or concentration of harmful or undesirable gas emissions within the treated exhaust flow 322 as a whole, thereby potentially resulting in too much or too little reductant being injected into engine exhaust 306.

In order to promote more effective mixing of the first treated flow portion 308 and second treated flow portion 310 within the outlet chamber 303, a chamber mixer 316 is included within the SCR canister 300. For instance, the chamber mixer 316 may be positioned within the SCR canister 300 upstream of the SCR outlet 230. The chamber mixer 316 may generally be configured to introduce turbulence into one or both of the first treated flow portion 308 or the second treated flow portion 310 and promote a more homogenously mixed treated exhaust flow 322. By more effectively mixing the first and second treated flow portions 308, 310, the sensor readings from the exhaust sensor 250 may more accurately represent the amount of harmful or undesirable gas emissions within the treated exhaust flow 322 as a whole. Furthermore, the controller 260 (FIG. 2) may implement a control action, such as adjusting the combustion temperature of the engine 114 and/or varying the amount of reductant injected into the DOC system 204, based on a more accurately determined amount of exhaust emissions contained within the treated exhaust flow 322.

Referring still to the embodiment of FIG. 3, the SCR canister 300, first SCR chamber 302, and/or second SCR chamber 304 may, but not by way of limitation, have a generally cylindrical shape(s). As shown, the first SCR chamber 302 may be positioned closer to the SCR outlet 230 than the second SCR chamber 304. Furthermore, in certain embodiments, the first SCR chamber 302 may be positioned fully or partially downstream of the second SCR chamber 304 relative to the second treated flow portion 310. However, in other embodiments, the SCR chambers may be positioned next to one another or approximately next to one another along the length of the SCR canister 300. It will be appreciated that the SCR canister 300, the first SCR chamber 302, and/or the second SCR chamber 304 may have any configuration so long as the SCR system 208 operates as described herein. In one embodiment, as explained above, the engine exhaust 306 may be split at the inlet 229 into the first portion of the engine exhaust 307 and the second portion of the engine exhaust 309 in order to flow along the first and second exhaust flowpaths 312, 314, respectively. Furthermore, as shown, one or more flow dividers or sealing elements (flow divider 319) may be positioned between the first and second exhaust flowpaths 312, 314 in order to reduce or prevent cross-flow between the flowpaths 312, 314 upstream of the outlet chamber 303.

The first portion of the engine exhaust 307 may generally be received by the first SCR chamber 302 at a first inlet 321 of the first SCR chamber 302. The first portion of the engine exhaust 307 may be reacted with the exhaust reductant and catalyst within the first SCR chamber 302 before being subsequently expelled from the first SCR chamber 302 at a first outlet 323 of the first SCR chamber 302 as the first treated flow portion 308. Similarly, the second portion of the engine exhaust 309 may generally be received by the second SCR chamber 304 at a second inlet 329 of the second SCR chamber 304. The second portion of the engine exhaust 309 may be reacted with the exhaust reductant and catalyst within the second SCR chamber 304 before being subsequently expelled from the second SCR chamber 304 at a second outlet 327 of the second SCR chamber 304 as the second treated flow portion 310. The SCR chambers 302, 304 may each include one or more substrates, for example, consisting of cordierite, silicon carbide, other ceramic, or metal structure, or other suitable compositions. The substrates may form a honeycomb structure with a plurality of through going channels or cells for the first portion of the engine exhaust 307 and second portion of the engine exhaust 309 to pass through and promote the reaction with the exhaust reductant and catalyst, forming the first and second treated flow portions 308, 310, respectively. Alternatively, however, the substrates may form any structure or configuration so long as the substrates operate as described herein.

In several embodiments, the chamber mixer 316 may include a plurality of louvered members 324 configured to generally introduce turbulence within the first and/or second treated flow portions 308, 310. For example, the louvered members 324 may generally be configured deflect and turn the first and/or second treated flow portions 308, 310 toward a first side 318 and/or a second side 320 of the SCR canister 300 such that turbulence is introduced to promote mixing of the treated flow portions 308, 310. For example, the chamber mixer 316 may be positioned within the first outlet 323 of the first SCR chamber 302, the second outlet 327 of the second SCR chamber 304, or both. As shown in the exemplary embodiment of FIG. 3, the louvered members 324 may extend across the first outlet 323 of the first SCR chamber 302 in order to introduce turbulence into the first treated flow portion 308. For example, the louvered members 324 of FIG. 3 are oriented such that the first treated flow portion 308 is turned toward the second side 320 of the SCR canister 300 in order to promote mixing of the first treated flow portion 308 and the second treated flow portion 310. Particularly, in certain embodiments, the first treated flow portion 308 may be turned to the side of the SCR canister 300 closest to the second exhaust flowpath 314 to promote mixing of the treated flow portions 308, 310 within the outlet chamber 303. The louvered members 324 may be coupled to the first SCR chamber 302 using any suitable means, such as welding, adhesives, fasteners, friction fit, or the like.

As further illustrated in the exemplary embodiment of FIG. 3, the chamber mixer 316 may optionally include a flow diverger 336 configured such that the first treated flow portion 308, the second treated flow portion 310, or both flow around the flow diverger 336 before being exhausted through the SCR outlet 230 of the SCR canister 300 and encounter the exhaust sensor 250. For example, the flow diverger 336 may be positioned directly upstream of the exhaust sensor 250 relative to the exhaust flow 322 in order to prevent the first treated flow portion 308 from flowing directly from the first outlet 323, into the downstream flow conduit 210, and encountering the exhaust sensor 250 without adequately mixing with the second treated flow portion 310 within the outlet chamber 303. The flow diverger 336 may generally include a plate positioned to prevent the first or second treated flow portion 308, 310 from flowing directly into the SCR outlet 230 without properly mixing to form a homogenous, or approximately homogenous, exhaust flow 322 within the outlet chamber 303. The flow diverger 336 is illustrated as defining a circular cross-section in the embodiment of FIG. 3, but, in other embodiments, the flow diverger 336 may have any other suitable shape. Additionally, the flow diverger 336 may be coupled or otherwise fixed to or formed with the louvered members 324 on a downstream side of the chamber mixer 316 nearest the SCR outlet 230. However, in another embodiment, the flow diverger 336 may be coupled or otherwise fixed to the louvered members 324 on the side of the chamber mixer 316 opposite the SCR outlet 230. Alternatively, the louvered members 324 may define a void configured to receive the flow diverger 336, and at least a portion of the louvered members 324 adjacent to the void may be coupled, fixed, or otherwise formed integrally with the flow diverger 336.

Figure 4:
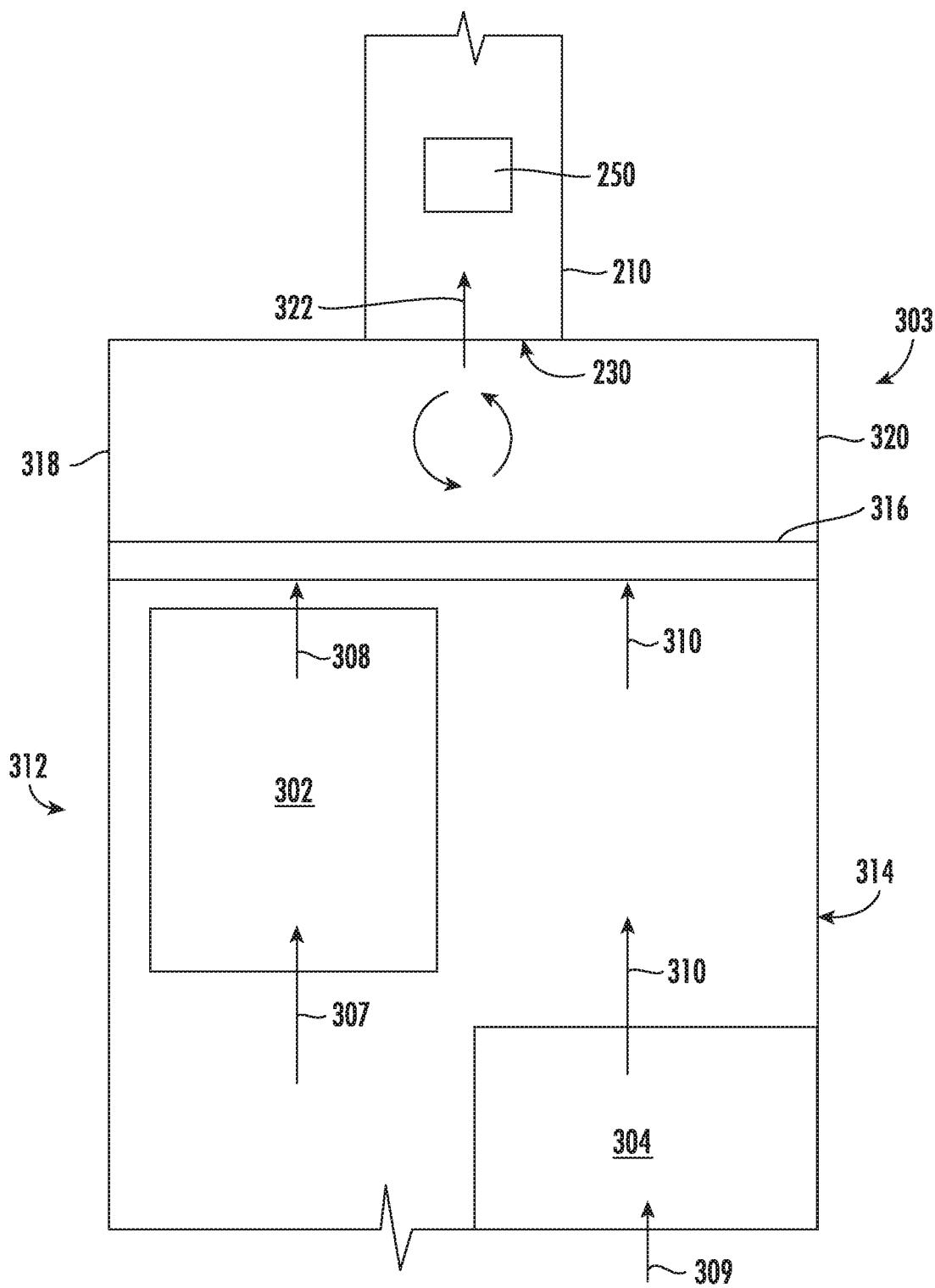
FIG. 4 illustrates a schematic view of another embodiment of a SCR system suitable for use within the disclosed exhaust treatment system in accordance with aspects of the present subject matter, particularly illustrating another embodiment of a chamber mixer associated with the SCR system.

Referring now to FIG. 4, a schematic view of an alternative embodiment of the SCR system 208 described above with reference to FIG. 2 is illustrated in accordance with aspects of the present subject matter. Particularly, FIG. 4 illustrates an embodiment of the SCR system 208 with the chamber mixer 316 positioned downstream of the SCR chambers 302, 304 relative to the first treated flow portion 308 and the second treated flow portion 310, respectively. However, it should be appreciated that aspects of the depicted chamber mixer 316 and SCR system 208 may be utilized within any suitable exhaust treatment system 200 of a given work vehicle 100. The SCR system 208 of FIG. 4 may generally be configured the same as or similar to the SCR system 208 of FIG. 3. For instance, an SCR canister 300 may house two SCR chambers 302, 304 for reacting a first portion of the engine exhaust 307 and a second portion of the engine exhaust 309 within the chambers 302, 304 to form a first treated flow portion 308 and a second treated flow portion 310, respectively. Further, the first treated flow portion 308 and the second treated flow portion 310 may be combined into a treated exhaust flow 322 within an outlet chamber 303 before being expelled via an SCR outlet 230. Subsequently, the treated exhaust flow 322 may flow to an exhaust sensor 250 positioned within the downstream flow conduit 210 extending from or otherwise fluidly coupled to the SCR outlet 230.

However, rather than positioning a mixer within an outlet of one or both of the SCR chambers 302, 304 (e.g., as described above with reference to FIG. 3), the chamber mixer 316 of FIG. 4 is positioned within the outlet chamber 303 downstream of the SCR chambers 302, 304 relative to the first treated flow portion 308 and the second treated flow portion 310, respectively. For example, the chamber mixer 316 may be positioned at an upstream position of the outlet chamber 303 relative to the treated exhaust flow 322.

Similar to the mixer embodiment described above, the chamber mixer 316 may include a plurality of louvered members (omitted for clarity) configured to generally introduce turbulence within the first and second treated flow portions 308, 310. For example, each of the louvered members may generally be configured deflect and turn the first and second treated flow portions 308, 310 toward a first side 318 or a second side 320 of the SCR canister 300 such that turbulence is introduced to promote mixing of the flow portions 308, 310. The louvered members of the chamber mixer 316 may extend across the SCR canister 300 in order to introduce turbulence into the first treated flow portion 308 and the second treated flow portion 310. Particularly, in certain embodiments, the first treated flow portion 308 may be turned to a second side 320 of the SCR canister 300 closest to the second exhaust flowpath 314 to promote mixing the treated flow portions 308, 310 within the outlet chamber 303. Additionally or alternatively, the second treated flow portion 310 may be turned to a first side 318 of the SCR canister 300 closest to the first exhaust flowpath 312 to promote mixing the treated flow portions 308, 310 within the outlet chamber 303. Moreover, louvered members of the chamber mixer 316 may be coupled to the SCR canister 300 using any suitable means, such as welding, adhesives, fasteners, friction fit, or the like.

Figure 5:
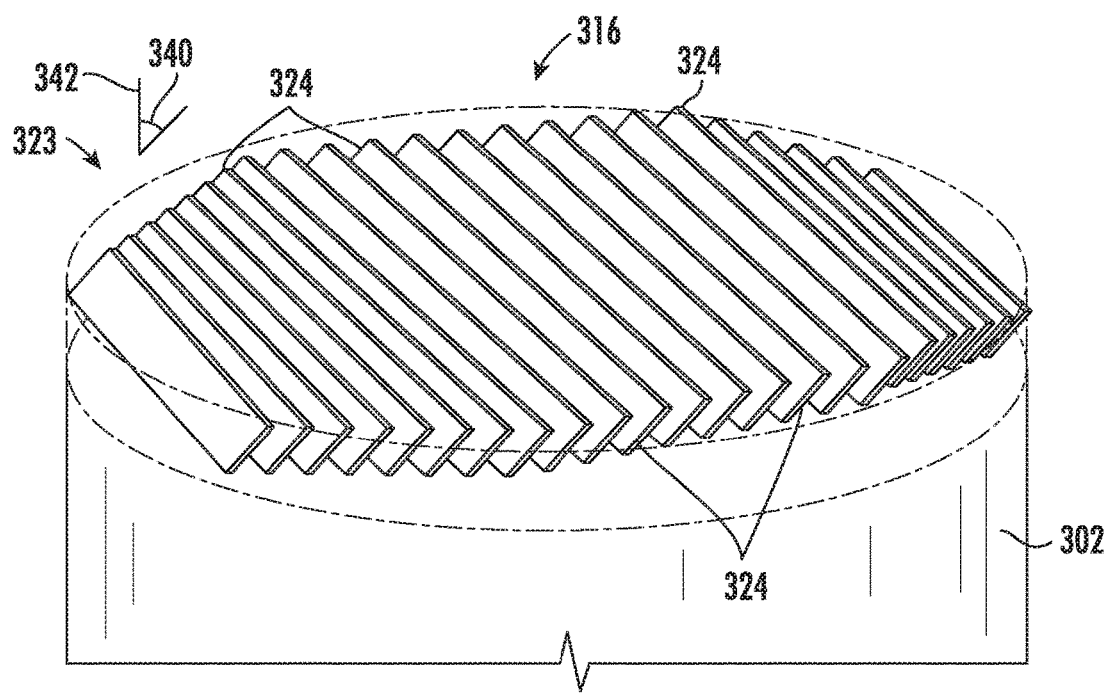
FIG. 5 illustrates a schematic view of one embodiment a chamber mixer suitable for use with the disclosed SCR system, particularly illustrating an embodiment of louvered members of the chamber mixer configured to deflect treated engine exhaust flow toward the same side of an SCR canister of the SCR system.
Figure 6:
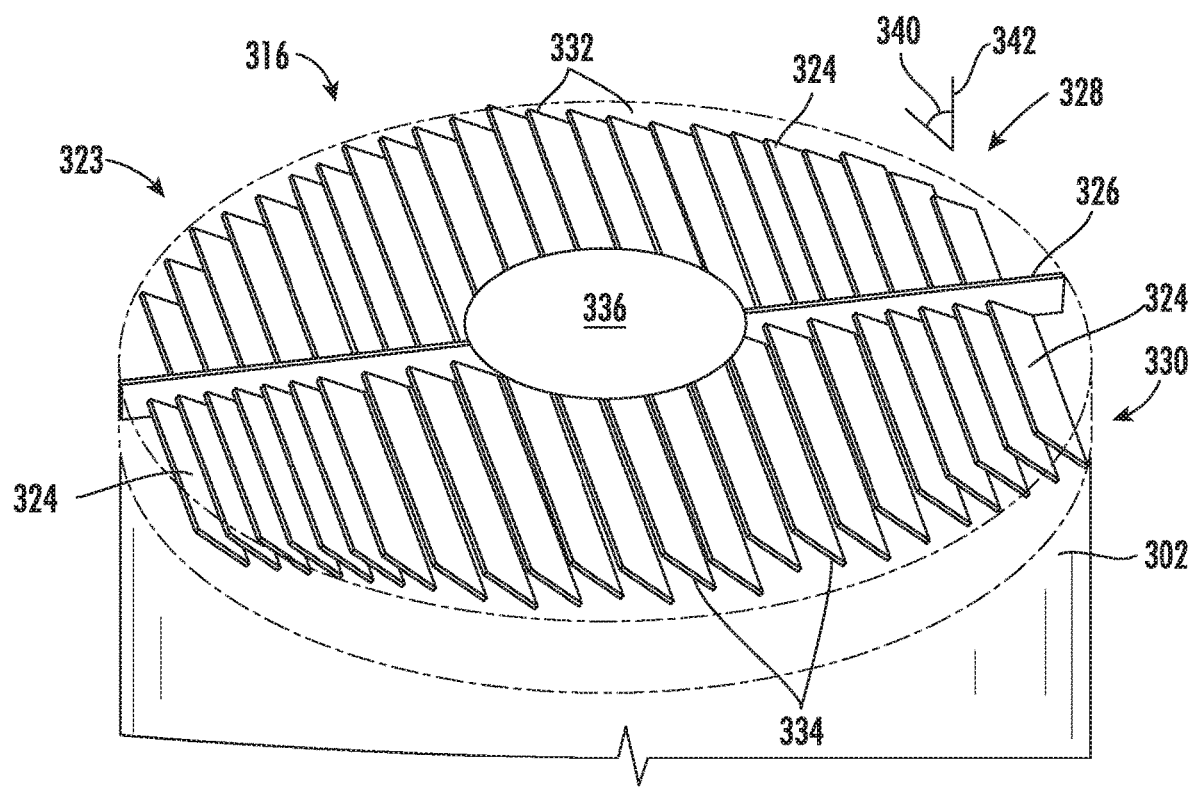
FIG. 6 illustrates a schematic view of another embodiment of a chamber mixer suitable for use with the disclosed SCR system, particularly illustrating an embodiment of the chamber mixer including a cross-beam associated with the louvered members.
Figure 7:
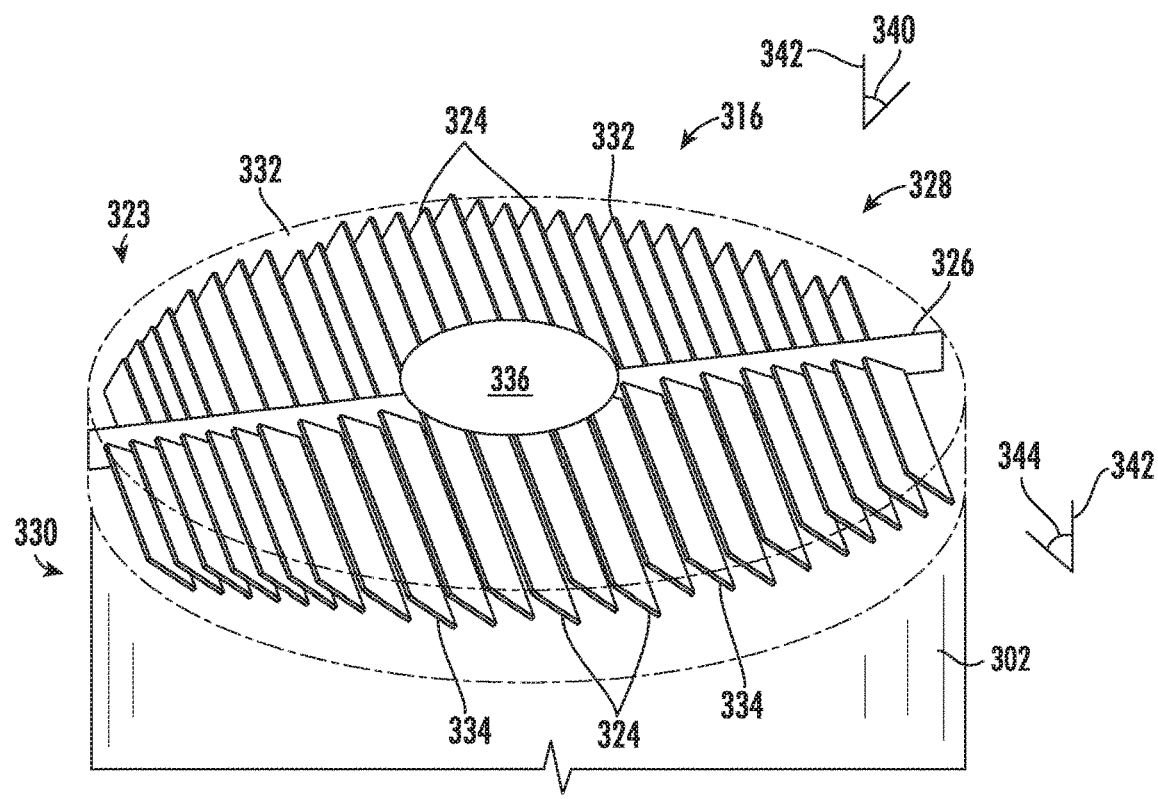
FIG. 7 illustrates a schematic view of another embodiment of a chamber mixer suitable for use with the disclosed SCR system, particularly illustrating an embodiment of the chamber mixer including louvered members configured to deflect portions of the treated engine exhaust flow toward different sides of an SCR canister of the SCR system.
Figure 8:
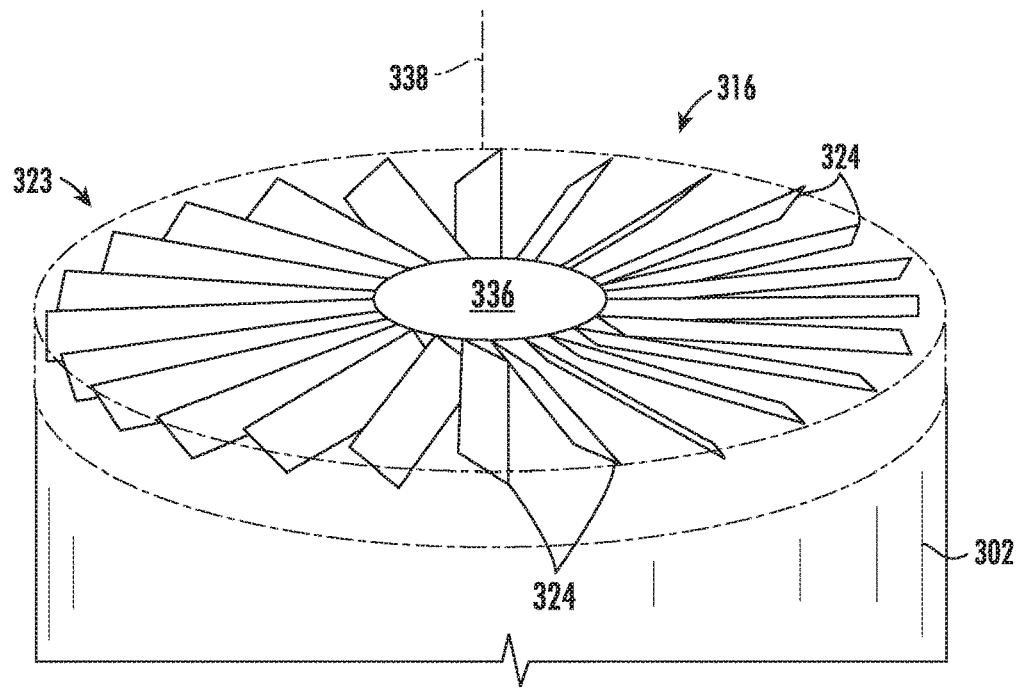
FIG. 8 illustrates a schematic view of a further embodiment of a chamber mixer suitable for use with the disclosed SCR system, particularly illustrating an embodiment of the chamber mixer including louvered members configured to generate a swirl within a treated engine exhaust flow.

Referring now to FIGS. 5-8, multiple views of embodiments of different chamber mixers including different configurations of louvered members of the chamber mixers are illustrated in accordance with aspects the present subject matter. For instance, any embodiment of the louvered members 324 illustrated with reference to FIGS. 5-8 may be utilized within the chamber mixers 316 as described above with reference to FIGS. 3 and 4. Particularly, FIG. 5 illustrates an embodiment of the chamber mixer 316 including louvered members 324 configured to deflect the first and/or second treated flow portions 308, 310 toward the same side of the SCR canister 300. FIG. 6 illustrates an embodiment of the chamber mixer 316 including a cross-beam 326 configured to divide the chamber mixer 316 into a first region 328 and a second region 330. FIG. 7 illustrates an embodiment of the chamber mixer 316 including louvered members 324 configured to deflect the first and/or second treated flow portions 308, 310 passing through separate regions of the chamber mixer 316 to different sides of the SCR canister 300. FIG. 8 illustrates an embodiment of the chamber mixer 316 including louvered members 324 configured to generate a swirl within the first and/or second treated flow portions 308, 310.

While the embodiments of FIGS. 5-8 are illustrated in the context of chamber mixers 316 positioned within the first outlet 323 of the first SCR chamber 302, it should be appreciated the aspects of the depicted flow mixers 316 may be utilized in association with chamber mixers 316 at any other suitable location. For instance, the chamber mixer 316 may be positioned at the second outlet 327 of the second SCR chamber 304 and/or within the outlet chamber 303. Additionally, it should be appreciated that, in alternative embodiments, the chamber mixer(s) 316 may include any combination of the features described with reference to FIGS. 5-8 or have any other suitable configuration such that the louvered members 324 of the mixer(s) 316 introduce turbulence within the first and/or second treated flow portions 308, 310 and/or promote mixing of the first and second treated flow portions 308, 310 within the outlet chamber 303. Furthermore, it should be appreciated that the disclosed embodiments of the chamber mixer(s) 316 may be utilized within any suitable SCR system associated with an exhaust treatment system of a given work vehicle.

Referring to the embodiments of FIGS. 5 and 6, the louvered members 324 may be configured to introduce turbulence into the first and/or second treated flow portions 308, 310 by deflecting the first and/or second treated flow portions 308, 310 toward a side of the SCR canister 300. For example, the first and/or second treated flow portions 308, 310 may be deflected toward the first side 318 or the second side 320 of the SCR canister 300 to promote mixing of the flow portions 308, 310 within the outlet chamber 303. As shown, in one embodiment, the louvered members 324 may be configured as thin longitudinal beams oriented at an angle 340 relative to a longitudinal axis 342 of the SCR canister 300. As such, the louvered members 324 may deflect the first and/or second treated flow portions 308, 310 toward a side of the SCR canister 300 in the direction of the angle 340 relative to the longitudinal axis 342. Furthermore, it should be appreciated that each of the louvered members 324 may define the same or approximately the same angle 340 relative to the longitudinal axis 342.

As shown in the embodiments of FIGS. 6 and 7, the chamber mixer 316 may include a cross-beam 326 configured to separate the chamber mixer 316 into the first region 328 and the second region 330. Additionally, or alternatively, the cross-beam 326 may improve the strength of the chamber mixer 316 and/or support the louvered members 324. For instance, the cross-beam 326 may generally be oriented perpendicular to the louvered members 324. However, in other embodiments, the cross-beam 326 may be oriented parallel to the louvered members 324 or define any other suitable angle relative to the louvered members 324. As shown, the cross-beam 326 may divide the louvered members 324 into first louvered members 332 within the first region 328 of the chamber mixer 316 and second louvered members 334 within the second region 330 of the chamber mixer 316. Furthermore, in one embodiment, the cross-beam 326 may be notched such that the cross-beam 326 is inserted on top of the louvered members 324 or such that the louvered members 324 may be inserted on top of the cross-beam 326. For instance, the cross-beam 326 may include a notch for each louvered member 324 of the chamber mixer 316. In an additional or alternative embodiment, the louvered members 324 may be coupled or otherwise fixed to the cross-beam 326, such as via welding, adhesion, fasteners, or the like, or formed integrally with the louvered members 324, such as via casting or an additive manufacturing process. Furthermore, as shown an optional flow diverger 336 may be arranged on top of the cross-beam 326 and coupled to, otherwise fixed, or formed integrally with the cross-beam 326 and/or louvered members 324.

Referring particularly to FIG. 7, in several configurations of the chamber mixer 316, the louvered members 324 may be configured to introduce turbulence into the first and/or second treated flow portions 308, 310 by deflecting portions of the first and/or second treated flow portions 308, 310 towards different sides of the SCR canister 300. For example, at least a portion of the first and/or second treated flow portions 308, 310 may be deflected toward the first side 318 of the SCR canister 300, and a different portion of the first and/or second treated flow portions 308, 310 may be deflected toward the second side 320 of the SCR canister 300 to promote mixing of the flow portions 308, 310 within the outlet chamber 303. As shown, the first louvered members 332 may be oriented at an angle 340 relative to a longitudinal axis 342 of the SCR canister 300. As such, the first louvered members 332 may deflect a first portion of the first and/or second treated flow portions 308, 310 flowing through the first region 328 of the chamber mixer 316 toward a side of the SCR canister 300 in the direction of the angle 340 relative to the longitudinal axis 342, such as toward the second side 320 of the SCR canister 300. Furthermore, the second louvered members 334 may be oriented at a second angle 344 relative to the longitudinal axis 342 of the SCR canister 300 different than the angle 340, such as opposite of the angle 340 relative to the longitudinal axis 342 of the first louvered members 332. As such, the second louvered members 334 may deflect a second portion of the first and/or second treated flow portions 308, 310 flowing through the second region 330 of the chamber mixer 316 toward a side of the SCR canister 300 in a direction of the second angle 344 relative to the longitudinal axis 342, such as toward the first side 318 of the SCR canister 300. Furthermore, it should be appreciated that each of the first louvered members 332 may define the same or approximately the same angle 340 relative to the longitudinal axis 342, and each of the second louvered members 334 may define the same or approximately the same second angle 344 relative to the longitudinal axis 342. However, it is contemplated that louvered members 324 within the same region of the chamber mixer 316 may define two or more distinct angles.

Referring now to the embodiment of FIG. 8, the louvered members 324 may be configured to introduce turbulence into the first and/or second treated flow portions 308, 310 by deflecting the first and/or second treated flow portions 308, 310 circumferentially relative to a center of the chamber mixer 316. For instance, as shown, the louvered members 324 may extend radially from the center (e.g., from a centerline 338) of the chamber mixer 316. Moreover, such a configuration of the louvered members 324 may generate a swirl within the first and/or second treated flow portions 308, 310 and thereby promote more effecting mixing of the first and second treated flow portions 308, 310 within the outlet chamber 303. Additionally, as shown, a flow diverger 336 may be configured to be positioned at or approximately at the center of the chamber mixer 316.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed:

1. A selective catalytic reduction (SCR) system, the SCR system comprising:
    a SCR canister including a SCR inlet configured for receiving engine exhaust from a work vehicle and a SCR outlet configured for expelling a treated exhaust flow;
    a first SCR chamber housed within the SCR canister and configured to react a mixture of exhaust reductant and a first portion of the engine exhaust with a catalyst to generate a first treated exhaust flow portion;
    a second SCR chamber housed within the SCR canister and configured to react a mixture of exhaust reductant and a second portion of the engine exhaust with a catalyst to generate a second treated exhaust flow portion;
    an outlet chamber positioned between the SCR outlet and the first and second SCR chambers, the outlet chamber configured to combine the first treated exhaust flow portion and the second treated exhaust flow portion to form the treated exhaust flow; and
    a chamber mixer comprising a plurality of louvered members and positioned upstream of the SCR outlet, the chamber mixer configured to promote mixing of the first and second treated exhaust flow portions within the outlet chamber,
    wherein the chamber mixer further comprises a cross-beam oriented perpendicular to the plurality of louvered members such that the chamber mixer defines a first region and a second region of the chamber mixer separated by the cross-beam, wherein each louvered member of plurality of louvered members in the first region is oriented to deflect at least one of the first treated exhaust flow portion or the second treated exhaust flow portion toward a first side of the SCR canister, and wherein each louvered member of the plurality of louvered members in the second region is oriented to deflect at least one of the first treated exhaust flow portion or the second treated exhaust flow portion toward an opposite second side of the SCR canister.

2. The system of claim 1, further comprising:
    a flow conduit in fluid communication with the SCR outlet and configured for receiving the treated exhaust flow expelled from the SCR outlet; and
    an exhaust sensor positioned within the flow conduit downstream of the SCR outlet, the exhaust sensor being configured to detect an amount of an emission gas present in the treated exhaust flow.

3. The system of claim 2, wherein the chamber mixer further includes a flow diverger positioned directly upstream of the exhaust sensor and configured such that at least one of the first treated exhaust flow portion or the second treated exhaust flow portion must flow around the flow diverger before encountering the exhaust sensor.

4. The system of claim 2, wherein the exhaust sensor is a nitrous oxide (NOx) sensor.

5. The system of claim 1, wherein the chamber mixer is positioned within an outlet of at least one of the first SCR chamber or second SCR chamber, the plurality of louvered members extending across the outlet of at least one of the first SCR chamber or second SCR chamber.

6. The system of claim 5, wherein the plurality of louvered members of the chamber mixer is configured to introduce turbulence into at least one of the first treated exhaust flow portion or the second treated exhaust flow portion.

7. The system of claim 1, wherein the chamber mixer is positioned within the outlet chamber downstream of the first and second SCR chambers, the plurality of louvered members extending across the SCR canister.

8. The system of claim 1, wherein each louvered member of the plurality of louvered members is oriented to deflect at least one of the first treated exhaust flow portion or the second treated exhaust flow portion to one side of the SCR canister.

9. The system of claim 1, wherein the chamber mixer defines a center, the plurality of louvered members extending radially outwardly from the center, and wherein the plurality of louvered members are oriented to impart a swirl in at least one of the first treated exhaust flow portion or the second treated exhaust flow portion.

10. An exhaust treatment system for a work vehicle, the system comprising:
    an exhaust conduit configured for transmitting engine exhaust from an engine;
    a DOC system in flow communication with the exhaust conduit, the DOC system configured to introduce an exhaust reductant into the engine exhaust to form an exhaust/reductant mixture;
    a selective catalytic reduction (SCR) system, the SCR system comprising:
        a SCR canister including a SCR inlet configured for receiving the exhaust/reductant mixture expelled from the DOC system and a SCR outlet configured for expelling a treated exhaust flow;
        a first SCR chamber housed within the SCR canister and configured to react a first portion of the exhaust/reductant mixture with a catalyst to generate a first treated exhaust flow portion;
        a second SCR chamber housed within the SCR canister and configured to react a second portion of the exhaust/reductant mixture with a catalyst to generate a second treated exhaust flow portion;
        an outlet chamber positioned between the SCR outlet and the first and second SCR chambers, the outlet chamber configured to combine the first treated exhaust flow portion and the second treated exhaust flow portion to form the treated exhaust flow; and
        a chamber mixer comprising a plurality of louvered members and positioned upstream of the SCR outlet, the chamber mixer configured to promote mixing of the first and second treated exhaust flow portions within the outlet chamber, wherein the chamber mixer further comprises a cross-beam oriented perpendicular to the plurality of louvered members such that chamber mixer defines a first region and a second region of the chamber mixer separated by the cross-beam, wherein each louvered member of plurality of louvered members in the first region is oriented to deflect at least one of the first treated exhaust flow portion or second treated exhaust flow portion toward a first side of the SCR canister, and wherein each louvered member of the plurality of louvered members in the second region is oriented to deflect at least one of the first treated exhaust flow portion or second treated exhaust flow portion toward an opposite second side of the SCR canister.

11. The system of claim 10, further comprising:
a flow conduit in fluid communication with the SCR outlet and configured for receiving the treated exhaust flow expelled from the SCR outlet; and
an exhaust sensor positioned within the flow conduit downstream of the SCR outlet, the exhaust sensor being configured to detect an amount of an emission gas present in the treated exhaust flow.

12. The system of claim 11, wherein the chamber mixer further includes a flow diverger positioned directly upstream of the exhaust sensor and configured such that at least one of the first treated exhaust flow portion or the second treated exhaust flow portion must flow around flow diverger before encountering the exhaust sensor.

13. The system of claim 10, wherein the chamber mixer is positioned within an outlet of at least one of the first SCR chamber or the second SCR chamber, the plurality of louvered members extending across the outlet of at least one of the first SCR chamber or the second SCR chamber.

14. The system of claim 10, wherein the chamber mixer is positioned within the outlet chamber downstream of the first and second SCR chambers, the plurality of louvered members extending across the SCR canister.

15. The system of claim 10, wherein each louvered member of plurality of louvered members is oriented to deflect at least one of the first treated exhaust flow portion or the second treated exhaust flow portion to one side of the SCR canister.

16. The system of claim 10, wherein chamber mixer defines a center, the plurality of louvered members extending radially outwardly from the center, wherein the plurality of louvered members are oriented to impart a swirl in at least one of the first treated exhaust flow portion or second treated exhaust flow portion.

* * * * *